Sept. 15, 1942.　　　　E. V. CHAPMAN　　　　2,296,021
AUTOMOBILE SIGNAL LIGHT SWITCH
Filed Dec. 2, 1940
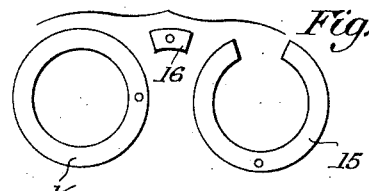
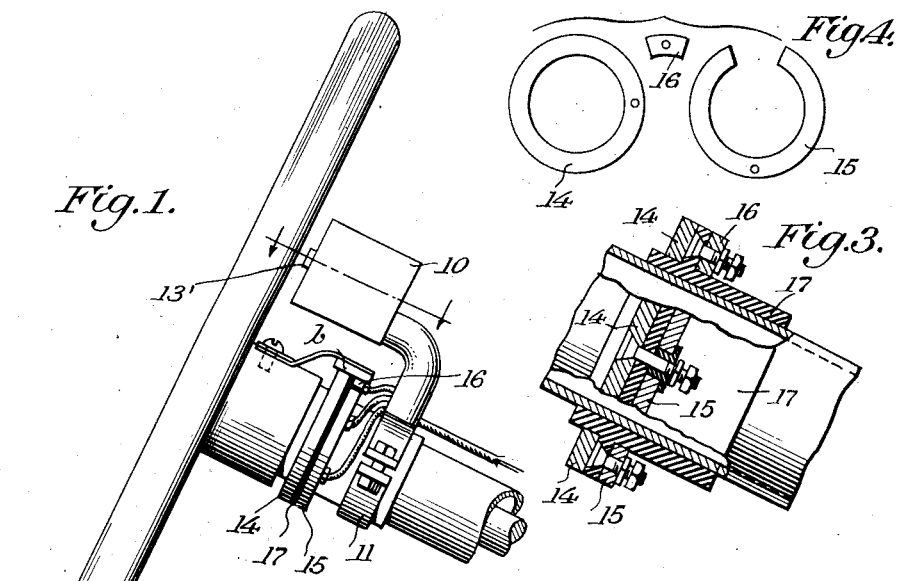
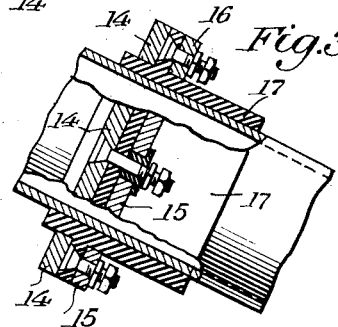
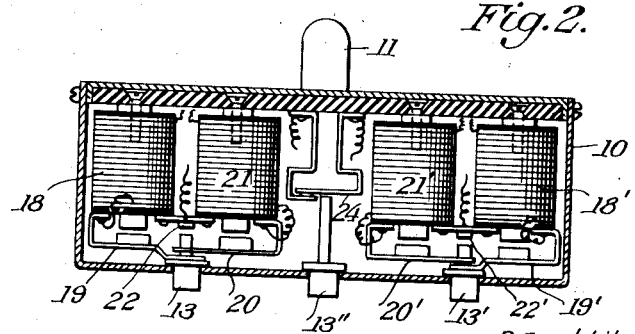
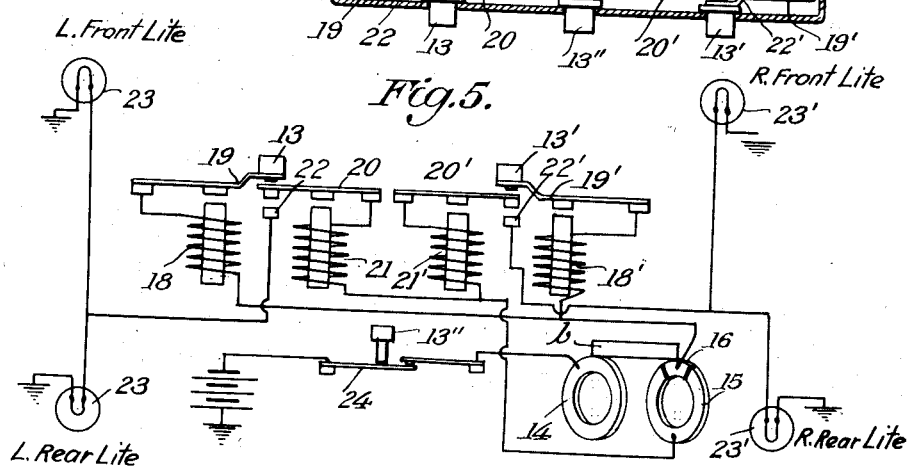
Elmer V. Chapman
INVENTOR
BY Victor J. Evans & Co.
ATTORNEYS Patented Sept. 15, 1942

2,296,021

UNITED STATES PATENT OFFICE 2,296,021

AUTOMOBILE SIGNAL LIGHT SWITCH

Elmer V. Chapman, Tinley Park, Ill.

Application December 2, 1940, Serial No. 368,258

1 Claim. (Cl. 200—59)

This invention relates to automobile signal light switches, and more particularly to those in which the driver may signal right or left turns through said lights.

One of the main problems in such devices, in which a turn is signaled by the driver by touching a button in close proximity to the steering wheel, is that of cutting off the turn signal when the turn is completed. In order to be practical, this must be accomplished by the steering wheel, which performs the actual extinguishing operation when turned straight after being in a turned position. I am aware that this problem has long engaged the attention of experts, and various means have been devised to accomplish this operation but, so far as I am aware, no one has solved this problem by the specific advantageous combination of means embodied in my invention.

The object of this invention is a device for safely and efficiently signalling turns from the driver's seat of a car.

Another object is a device whereby a turn light is extinguished by the movement of the steering wheel.

Still another object is a simple, economically operated device with a minimum of moving parts for accomplishing the above result.

These and other objects may be accomplished by employing my invention which embodies among its features a right turn circuit and a left turn circuit, each circuit containing two electromagnets and contact armatures associated therewith, one armature being dominant and positioned to mechanically hold down the other, or dominated, armature, the latter closing the light circuit when depressed, a push button to operate the dominant armature and a commutator wired with a central segment in circuit with the electromagnet of the dominant armature, and the side segments with the dominated armature. Thus, when the central segment is contacted and the button is pushed, the dominant armature is held down electrically and the dominated armature mechanically; when the commutator is turned so a side segment is contacted, the dominant armature is released and the dominated armature held down electrically; when the commutator is turned back this armature is released and the light circuit broken. The commutator is attached to a steering wheel of a car so that the central segment is contacted when the wheel is straight, thus, when a turn is made, the light circuit is broken when the wheel is turned back to "straight" position after a turn.

Other features and objects may become evident from the following description when taken in connection with the accompanying drawing in which:

Figure 1 is a side elevation of a steering wheel with my light mechanism in place, Figure 2 is a cross-section taken on line 2—2 of Figure 1, Figure 3 is a cross-section taken axially through Figure 1, Figure 4 is a plan view of the contact parts of the commutator, in disassembled position, and Figure 5 is a wiring diagram of the various circuits of my device.

Referring to the drawing in detail, the control element of my device consists of a casing 10 held by clamping means 11 in any convenient position, such as directly under the steering wheel, as shown in Figure 1. Extending through the top of the casing are push buttons 13, 13' and 13" which operate the controls for right turn, left turn and neutral, as will be explained.

Also mounted on the steering gear column is a commutator which consists of a ring 14, a large segment 15 and a small segment 16. As may be seen in Figure 3 these parts are held in place by screws on an insulating sleeve 17. A brush $b$ is attached to the steering wheel and wipes the ring and segments to establish contact therebetween. It will be noted that the commutator is positioned so that when the wheel is in "straight" position, the brush $b$ establishes contact between the ring 14 and small segment 16 but either a right or left turn breaks this and throws the contact into the segment 15.

Inside the control box 10 is a pair of electromagnets and armatures for each turn light, as shown in Figure 2. The magnet 18 has an armature 19 which overlaps the armature 20 of the magnet 21. The armature 20 makes contact with a contact point 22 of the light circuit. It will thus be seen that pushing button 13 causes contact between 20 and 22 which will be held as long as the armature 20 is held down either mechanically by the armature 19 or electrically by the magnet 21.

As shown by the wiring diagram in Figure 5, the magnet 18 is wired through segment 16 and the magnet 21 is wired through segment 15. Accordingly, when the steering wheel is turned so that the brush $b$ leaves the magnet 18—the segment 16 circuit opens and closes the magnet 21—the segment 15 circuit, and armature 19 is released but armature 20 is still held down by the magnet 21, causing lights 23 to burn. When, however, the wheel is turned back so that brush $b$ opens this circuit, the magnet 21 releases the armature 20 which opens the circuit through 22 and extinguishes the turn lights 23.

In order to neutralize the device after an erroneous signal has been given, I provide a switch 24, operated by the button 13", which is directly in series with the current supply and opens all circuits.

In operation, when the driver wishes to make a turn he presses either 13 or 13' which closes the circuit to its respective turn light. Then when he actually makes the turn the movement of brush $b$ causes the magnet 18 to be deenergized but magnet 21 to be energized to retain the light circuit closed, as explained. However, when the wheel is turned back to "straight" position the brush $b$ leaves the segment 16, thereby deenergizing the magnet 21 to cause the armature 20 to open the light circuit, so the light will be extinguished. It will be noted that corresponding parts on the opposite turn light and magnet circuit are given the same reference numerals, primed.

Although a preferred embodiment is described herein I do not wish to be limited thereto, but only by the scope of the appended claim.

What is claimed is:

In a directional signal system for a vehicle having a tubular steering column and a wheel carrying steering shaft extended through the said column, an automatic switch means comprising a sleeve of insulating material secured on the steering column adjacent the steering wheel, a radially extending annular flange formed on the said sleeve, a continuous ring member of conducting material fitted to encircle the said sleeve and secured with one side thereof against a side of the said flange, a complementary ring member in the form of a nearly annular interrupted member of conducting material fitted about the sleeve and secured against the opposite side of the flange thereof, a segmental contact of arcuate formation fitted in annular concentric relation in the gap of the interrupted ring and insulated from the latter whereby the peripheral edges of the continuous and interrupted rings will be disposed in transversely spaced insulated relation and of corresponding diameter, a contact brush extended transversely of the peripheral edges of the said rings and making wiping contact therewith to form a bridging conductor, and a member connecting the said contact brush with the steering wheel for rotating the brush about the complementary contact rings upon turning the said steering wheel.

ELMER V. CHAPMAN.